(12) United States Patent
Otterström

(10) Patent No.: US 10,082,224 B2
(45) Date of Patent: Sep. 25, 2018

(54) FASTENING DEVICE

(71) Applicant: HELLERMANNTYTON AB, Kista (SE)

(72) Inventor: Måns Otterström, Billdal (SE)

(73) Assignee: HELLERMANNTYTON AB (SE)

( * ) Notice: Subject to any disclaimer, the term of this patent is extended or adjusted under 35 U.S.C. 154(b) by 7 days.

(21) Appl. No.: 15/524,203

(22) PCT Filed: Nov. 10, 2015

(86) PCT No.: PCT/EP2015/002253
§ 371 (c)(1),
(2) Date: May 3, 2017

(87) PCT Pub. No.: WO2016/074786
PCT Pub. Date: May 19, 2016

(65) Prior Publication Data
US 2017/0335994 A1 Nov. 23, 2017

(30) Foreign Application Priority Data
Nov. 13, 2014 (DE) .......... 10 2014 016 726

(51) Int. Cl.
*F16L 3/00* (2006.01)
*F16L 3/137* (2006.01)
(52) U.S. Cl.
CPC .................. *F16L 3/137* (2013.01)
(58) Field of Classification Search
CPC ............. F16L 3/137; F16L 3/12; H02G 3/32
USPC ................. 248/56, 62, 71, 74.3, 73
See application file for complete search history.

(56) References Cited

U.S. PATENT DOCUMENTS

| | | | |
|---|---|---|---|
| 2,969,216 A | 1/1961 | Hallsey | |
| 3,144,695 A | 8/1964 | Budwig | |
| 3,463,427 A | 8/1969 | Fisher | |
| 3,552,696 A | 1/1971 | Orenick | |
| 5,675,128 A * | 10/1997 | Simon | F16L 3/1033 174/135 |
| 5,820,083 A * | 10/1998 | Geiger | F16L 3/123 248/68.1 |

(Continued)

FOREIGN PATENT DOCUMENTS

| | | | |
|---|---|---|---|
| CN | 101170244 A | 4/2008 | |
| DE | 29507118 | * 4/1995 | ............. F16B 13/14 |

(Continued)

*Primary Examiner* — Gwendolyn W Baxter
(74) *Attorney, Agent, or Firm* — Robert J. Myers

(57) ABSTRACT

A mounting device includes a plug-in part with a shaft portion and a head portion and a base part with a rest surface and a retaining side opposed to the rest surface. The base part has locking legs projecting from a side of the rest surface configured to lock within an aperture of a carrier substrate. The base part connects with the plug-in part by inserting the shaft portion in a plug-in channel defined by the locking legs. The mounting device is configured to bring the head portion into engagement with the carrier substrate locked at the locking legs and guide a binder portion across the head portion and retain the binder portion at the base part such that the head portion is urged in the plug-in direction when connecting a binder by the binder portion guided across and connected while the base part is urged in the opposite direction.

13 Claims, 3 Drawing Sheets

(56) References Cited

U.S. PATENT DOCUMENTS

| | | | |
|---|---|---|---|
| 2008/0093251 A1 | 4/2008 | Doi Masayuki et al. | |
| 2010/0096511 A1* | 4/2010 | Olver | F16L 3/137 |
| | | | 248/65 |
| 2010/0104394 A1 | 4/2010 | Kwasiborski | |
| 2016/0025242 A1* | 1/2016 | Benthien | F16L 3/1222 |
| | | | 248/70 |

FOREIGN PATENT DOCUMENTS

| | | | |
|---|---|---|---|
| DE | 102004020021 A1 | 11/2005 | |
| FR | 2381225 A1 * | 9/1978 | F16L 3/10 |

\* cited by examiner

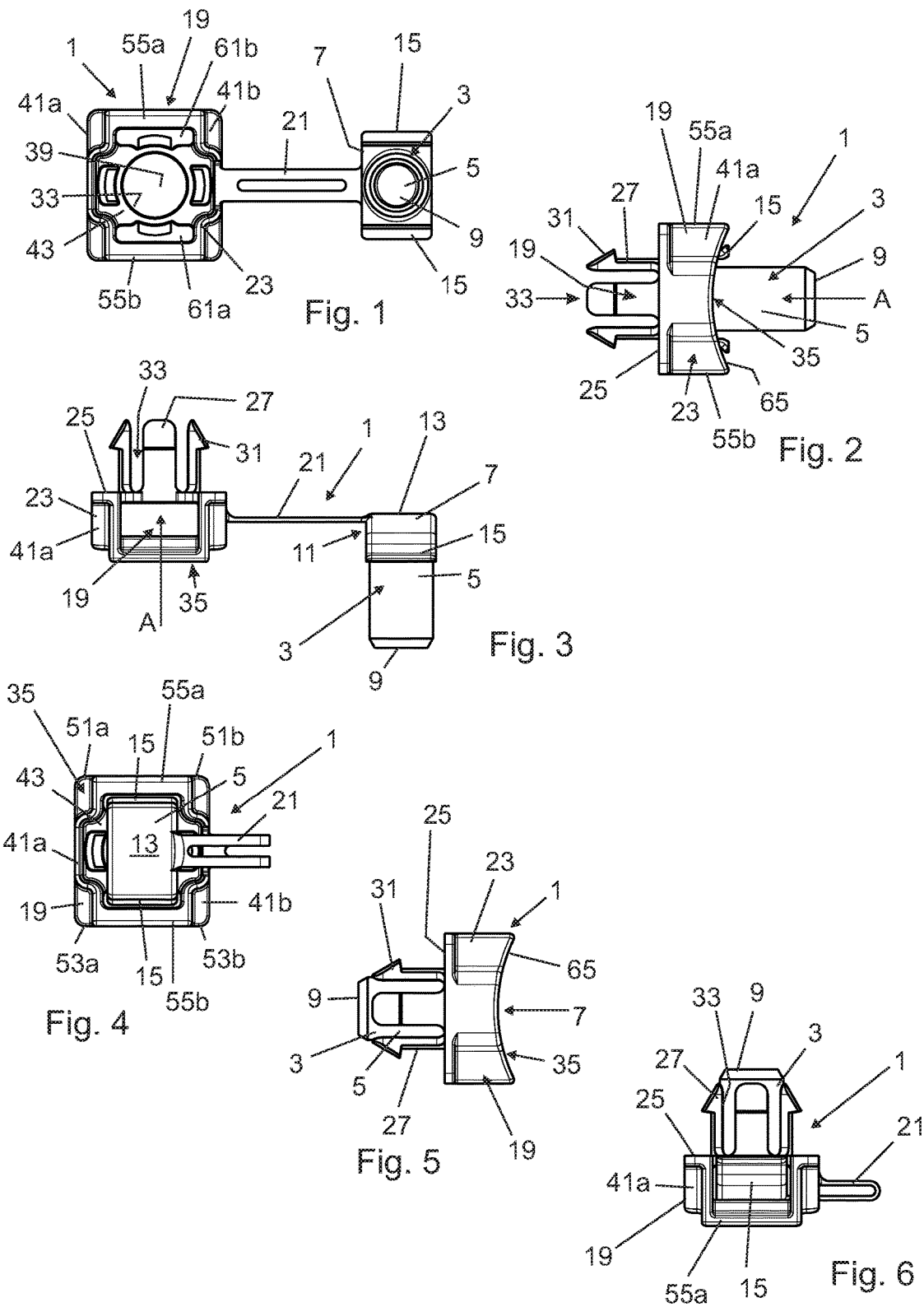

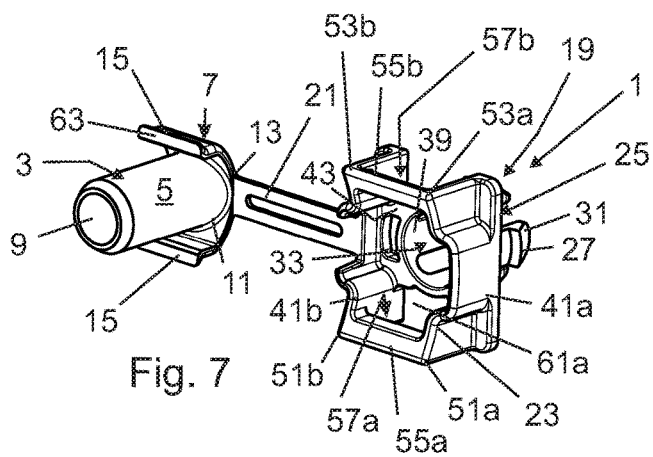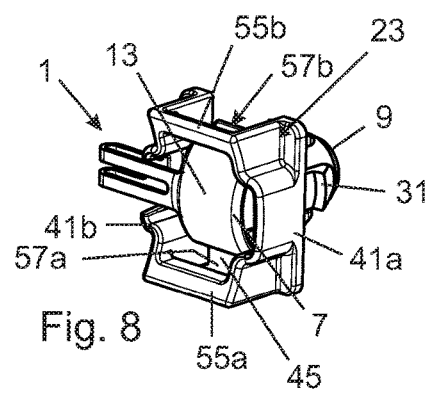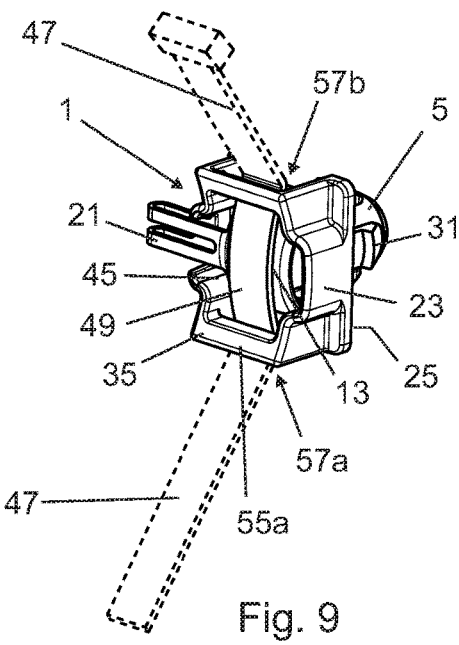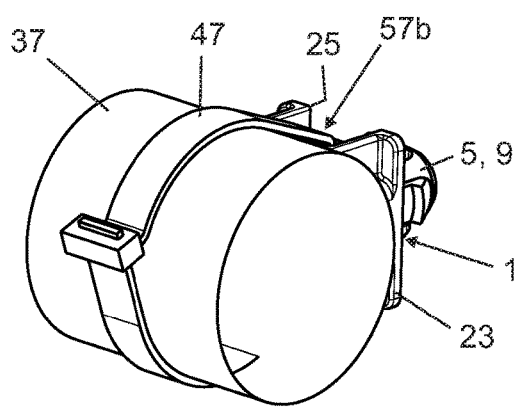

FASTENING DEVICE

CROSS-REFERENCE TO RELATED APPLICATIONS

This application is a national stage application under 35 U.S.C. § 371 of PCT Application Number PCT/EP2015/002253 having an international filing date of Nov. 10, 2015, which designated the United States, said PCT application claiming the benefit of German Patent No. 10-2014-016726, filed Nov. 14, 2014, the entire disclosure of each of which are hereby incorporated herein by reference.

TECHNICAL FIELD OF THE INVENTION

The present invention refers to a fastening device.

BACKGROUND OF THE INVENTION

To attach, or rather mount, elements like cables, pipes, or bundles formed from those to a carrier or carrier substrate, respectively, especially in form of a car body, diverse mounting devices interacting with binders or cable ties are known. Such solutions often allow snap-in at the carrier inserted in a bore of the same, whereby tolerances in the thickness of the carrier substrate, for example a formed metal sheet, however are hard to compensate for. To allow an attachment that is accurate and preferably free from clearance nevertheless, mostly more reliable solutions are envisaged, for example solutions utilizing screws, which however involve great handling effort both before mounting and while mounting, especially as such mounting devices are mostly multi-part, e.g. screw-nut-bearing-grommet-connections. Furthermore, such solutions are costly.

Therefore, a mounting device with advantageously low handling effort, which can be mounted and reliably attached to a carrier substrate and which is furthermore cost effective remains desired.

BRIEF SUMMARY OF THE INVENTION

This problem described above is solved with a mounting device according to claim 1. Further advantageous embodiments and developments of the invention are given in the additional claims.

Accordingly, a mounting device is presented. The mounting device is provided for mounting cables, pipes, bundles therefrom or similar elongated objects to a carrier substrate, i.e. for being able to attach them to the carrier substrate, especially also with a given orientation. Preferably the mounting device is provided for a connection with a carrier substrate in the form of a part of a car body, for example for connection with a sheet metal, a support frame or support beam, e.g. of a motor vehicle like an automobile, a ship or an airplane. In addition, however, other fields of application are imaginable.

The mounting device according to the invention, which is preferably made of plastic, comprises a plug-in part or plug-in element with a shaft portion and a head portion. The plug-in part is preferably formed stud-shaped, especially with a shaft portion in the form of a round shaft and furthermore especially with a head portion being arranged at one end of the shaft portion. Preferably the head portion projects beyond the shaft portion, e.g. hood-shaped, especially in the form of an U-shaped hood with the base of the U-shape being connected to the shaft portion and with the legs of the U-shape projecting towards a free end of the shaft portion. Thus, the head portion projecting beyond the shaft portion can form contact elements or contact tongues, respectively, especially in the form of the legs, which are provided for an engagement with a carrier substrate.

The mounting device further comprises a base part or rather a base element with a rest surface and a retaining side opposite to the rest surface. The rest surface is preferably formed at a chassis-shaped portion or rather enclosure-shaped portion of the base part and provided for getting into abutment against a preferably level or plate-shaped carrier substrate.

On the other hand it is intended to accommodate, especially to retain, a load to be connected to be mounted by means of the mounting device, e.g. a cable, a pipe, a bundle therefrom or the like at the retaining side. For this purpose at the retaining side the base part can form an accommodating form for load to be connected, i.e. be formed like a tub, a bowl or concave, whereby the accommodation can be formed with the chassis-shaped portion.

The base part furthermore comprises a number of locking legs which are provided for snapping-in or rather at an aperture, i.e. a mounting aperture or bore, of a carrier substrate and which project from the part of the rest surface. The base part constituted like that is plug-connectable with the preferably push-in-pin-shaped plug-in part by plugging the shaft portion into a plug-in channel of the base portion from the part of the retaining side. A plug-in direction intended with the invention furthermore points from the retaining side towards the rest surface.

The plug-in channel extending in the plug-in direction is preferably defined by means of the locking legs, especially amid the same or rather formed surrounded by them, with the locking legs in the context of the present invention e.g. constituting a ring configuration, especially a segmented ring configuration, i.e. projecting from the rest surface side of the base part. To be able to insert the plug-in part from the part of the retaining side in the plug-in channel defined by the locking legs its mouth is accessible from the retaining side. The mouth can for example be formed at a rest surface-sided bottom element of the base element, e.g. a web element or bridge element, whereas the further interior space of the base part basically can weight reducing be cleared.

In a preferred embodiment, the plug-in channel has a diameter such that the inserted shaft portion comes to rest at the locking legs with its outside circumference, so that great positional stability and stability of the joint can be reached. It should be noted that the embodiment of the mounting device able for the plug-connection of base part and plug-in part further allows to lock the locking legs by swiveling inwards before a plug connection, whereas after a plug-connection a self-acting release of the same from the interlock however is made impossible by the plug-in part then resting against them.

Contributing to the ability for self-adjustment of the mounting device aimed at with the invention, the mounting device furthermore is configured to be able to bring the head portion of the plug-in part plug-connected with the base part into engagement with a carrier substrate locked at the locking legs, i.e. especially to urge the head portion against the same at a mounting side of the carrier substrate adjoining the rest surface, opposite to a locking side of the carrier substrate. Intended herewith is an engagement of the head portion at the carrier via at least one—like explained above contact element in the form of a contact tongue, U-shaped leg, or projection here being especially elastic or else elastically deformable and resilient. A chassis-shaped portion of the base part here is preferably suitably recessed, i.e. enabling the contact of the head portion at the carrier.

According to the invention the mounting device is especially for the purpose of self-adjustment and/or attachment at the carrier substrate further configured to be able to guide a binder portion, preferably of a cable tie, across the head portion of the plug-connected plug-in part and to set or rather to retain the binder portion at the base part such that the head portion with the mounting device locked to the carrier substrate and connecting the binder preferably around a load to be connected in abutment at the retaining side is urged in plug-in direction of the plug-in part by means of the binder portion guided across and connected which binder portion is tightened herewith, while the base part is simultaneously urged in opposite direction.

To provide this functionality according to the invention here e.g. at opposing edge regions especially of above mentioned chassis-shaped portion—between which the head portion is especially arranged after plugging into the plug-in channel—the base part can comprise each a conduct for a binder strap, e.g. in form of a guiding slot or passage. The conducts thereby are preferably arranged such that the head portion with plugged-in plug-in part slightly projects over the line of sight of the conducts adversely to the insertion direction, consequently disabling a visual contact.

A binder portion threaded through the edge-sided conducts and guided across the head arranged therebetween can then in case of connecting tightening exert a compressing force on the head which acts in the direction towards the carrier substrate hereby contact elements of the head portion insofar are forced into engagement with the carrier substrate. Especially solutions with which also the load to be connected can get into abutment at the binder portion guided across the head portion at the retaining side can produce a great compression force.

Furthermore by the part of the binder also a pulling force opposed to the compression force is introduced into the base part, i.e. by the conducts at the base part which forces the locking legs against the carrier substrate at the locking side.

Thus the carrier substrate is self-actingly jammed by the mounting device by means of the connected binder from two sides, i.e. from the mounting side and from the locking side.

Consequently attachment forces, i.e. a compression force and a counter force causally effected by the binder connected at the base part, are exerted on both sides of the carrier substrate by the mounting device. Advantageously accompanied therewith is a permanent self-attachment of the mounting device when connecting the binder, furthermore self-compensating possible tolerances advantageously.

A preferred solution generally envisages that the mounting device is configured to guide a connected binder and/or retain thereto W-shaped by means of the conducts and the head portion.

In further development of the mounting device it is proposed to establish the mounting device one-piece. Thus handling is very simple. The mounting device can be manufactured by injection molding, especially from plastic and furthermore in a single molding step, therefore also from one single material so that also manufacturing is extremely effortless and cost efficient.

Especially formed single-piece, the mounting device is furthermore preferably designed in a way that the plug-in part is connected with the base part by a strip portion. The strip portion can secure the plug-in part before mounting, advantageously unloosenably to the base part, furthermore also effect a pre-alignment of the head portion with the base part when plugging the plug-in part into the base part.

A pre-alignment e.g. is desired with solutions in which the plug-in part comprises a head portion with discrete contact elements each of which interacts with a corresponding clearance or rather opening in the base part, especially in the chassis.

Preferred embodiments furthermore envisage that the base part or rather its chassis-shaped portion comprises an opening each for a contact element of the head portion at radial opposite sides of the plug-in channel through which said contact elements are urged against the carrier substrate.

Further features and advantages of the invention arise from the following description of example embodiments of the invention, by means of the figures of the drawings showing details essential with the invention and from the claims. The individual features can be put into effect each on their own or with several of them in any combination with a variation of the invention.

BRIEF DESCRIPTION OF THE SEVERAL VIEWS OF THE DRAWING

Preferred embodiments of the invention are explained hereinafter more detailed by means of the drawings attached. In the drawings show:

FIG. 1 exemplary and schematically in a plan view a mounting device according to a possible embodiment of the invention;

FIG. 2 the mounting device of FIG. 1 in a side view;

FIG. 3 the mounting device according to FIG. 1 and FIG. 2 in a further side view;

FIG. 4 a plan view of the mounting device according to FIGS. 1 to 3 in a condition in which the plug-in part is plugged into the base part;

FIG. 5 a side view of the mounting device in a condition according to FIG. 4;

FIG. 6 another side view of the mounting device in the condition according to FIGS. 4 and 5;

FIG. 7 through 10 possible mounting steps with the mounting device and a load to be connected to be retained by the mounting device, FIG. 7 showing a perspective view of the mounting device according to FIGS. 1 to 3, FIG. 8 showing a perspective view of the mounting device in a condition according to FIGS. 4 to 6, FIG. 9 showing the mounting device with a binder portion guided across the head portion and FIG. 10 showing the mounting device with a binder connected at the load to be connected as well as at the mounting device;

In the following description and the drawings same reference numerals correspond with elements of same or comparable function.

FIGS. 1 to 13 each show a mounting device 1 according to the invention.

DETAILED DESCRIPTION OF THE INVENTION

Figure 11:
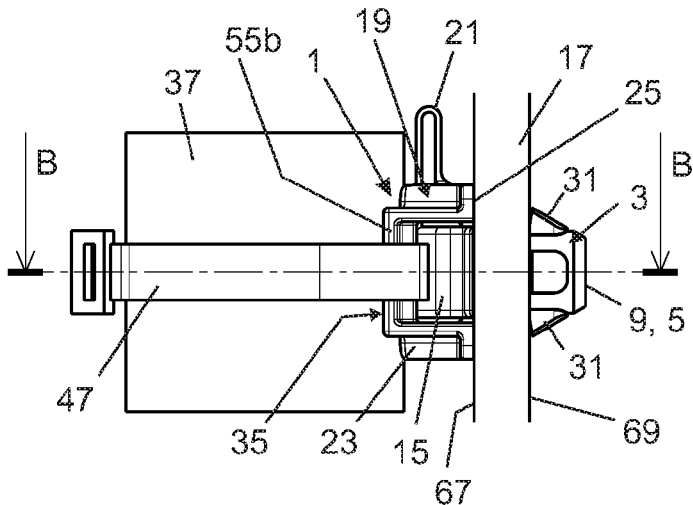
FIG. 11 a side view of the configuration according to FIG. 10, the mounting device furthermore being retained at a carrier substrate.

The mounting device 1, which is totally made from plastic, especially is injection molded, comprises, see e.g. FIGS. 1 to 3, a plug-in element or rather plug-in part 3 which is shaped in the form of a plug-in pin and includes a shaft portion 5 and a head portion 7. The shaft portion 5 is basically shaped like a round shaft or rather stud, especially formed like a hollow cylinder.

Opposed to a free end 9 of the shaft portion 5 the head portion 7 is formed to another end 11 of the shaft portion 5. The head portion 7 projects beyond the shaft portion 5 and is built or rather shaped like a U-shaped hood, see e.g. also FIG. 7, i.e. with a central portion 13 integrally formed with the shaft portion 5, from which central portion 13 two U-legs 15 protrude extending towards the free end 9, i.e. with radial distance to the shaft portion 5. Hence the legs 15 form—wing like—contact elements or rather contact tongues of the plug-in part 3 provided for contacting or rather abutment of the head portion 7 at a carrier substrate 17 as will be explained later on. The formations constituting the legs 15 are especially resiliently flexible. The central portion 13 furthermore is bulged convexly, see e.g. FIG. 8.

The mounting device 1 also comprises a base part 19 which with the preferred single-piece embodiment of the mounting device 1 is connected with the plug-in part 3 by a strip portion 21. For this purpose the strip portion 21 on the one hand is formed to the end 11 of shaft portion 5 or rather to the head portion 7, on the other hand to a chassis-shaped portion or rather chassis 23 of the base part 19.

The base part 19 includes a rest surface 25 provided for abutment against a carrier substrate 17, the rest surface 25 being provided at the chassis 23. The rest surface 25 is designed leveled for level abutment at the carrier substrate 17, i.e. at an underside of the chassis 23, e.g. FIG. 3.

Protruding from the side of the rest surface 25, especially from chassis 23, the base part 19 comprises a number of locking feet or rather locking legs 27, presently for example four locking legs 27. The locking legs 27 are arranged in a segmented ring configuration and provided for inserting into a corresponding mounting aperture 29 at a carrier substrate 17 and for locking therewith, see e.g. FIG. 12. For interlocking each of the locking legs 27 in this respect comprises a snap-in hook 31.

By means of the locking legs 27 furthermore a plug-in channel 33 is formed at the base part 19 or rather at the chassis 23, into which the plug-in part 3 is insertable by plugging-in its shaft portion 5 and consequently is plug-in connectable with the base part 19, see e.g. FIG. 1, 2, 6, 7, 12. Preferably the shaft portion 5 of the plug-in part 3 herewith has an outer diameter corresponding with the inner diameter of the plug-in channel 33 so that an abutment without clearance at each other is enabled, consequently also a connection with stable position.

With the invention a plug-in direction A is defined for the plug-in part 3, e.g. FIG. 2 and FIG. 3, pointing from a retaining side 35 of the base part 19 towards the rest surface 25. The retaining side 35 in turn is envisaged to retain thereupon a load to be connected 37 which is to be attached by means of the mounting device 1 at a carrier substrate 17, i.e. a cable, a pipe, a bundle of such or similar, see e.g. FIG. 10, FIG. 12, the retaining side 35 being a side of the base part 19 opposing the rest surface 25, e.g. an upper side.

To allow a plug-in into the plug-in channel 33 from the retaining side 35 a mouth 39 of the plug-in channel 33 is accessible from the part of the retaining side 35, for which purpose the frame-shaped chassis 23 is recessed accordingly, e.g. FIG. 7. The preferred embodiment of the base part 19 represented provides for example a chassis 23 which—in form of a bordering generally box type—is established by means of two longitudinal frame webs 41*a*, 41*b* between which—forming an restside-sided bottom of the chassis 23—a bridge web 43 extends, e.g. FIG. 1, FIG. 7, at which in turn the locking legs 27 as well as the mouth 39 of the plug-in channel 33 are established, furthermore a portion of the rest surface 25.

As especially shown by FIGS. 4 to 6 and 8 here the mounting device 1 is designed to accommodate the head portion 7 entirely within the interior space 45 of the chassis 23 or rather in the base part 19 so that the mounting device 1 in the plug-connected condition is advantageously small sized when plugging the plug-in part 3 into the base part 19, the end surface of the head portion 7 or rather the convex central portion 13 herewith lying free. The central portion 13 thus is available for the abutment of a binder 47, e.g. FIG. 8, 9, FIG. 13.

Figure 12:
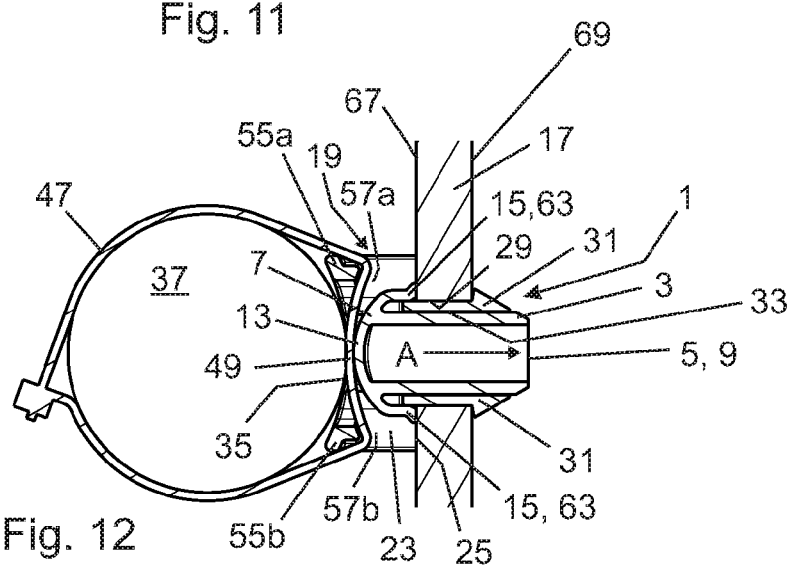
FIG. 12 a sectional view of the arrangement according to FIG. 11, the section being cut along a line B-B.
Figure 13:
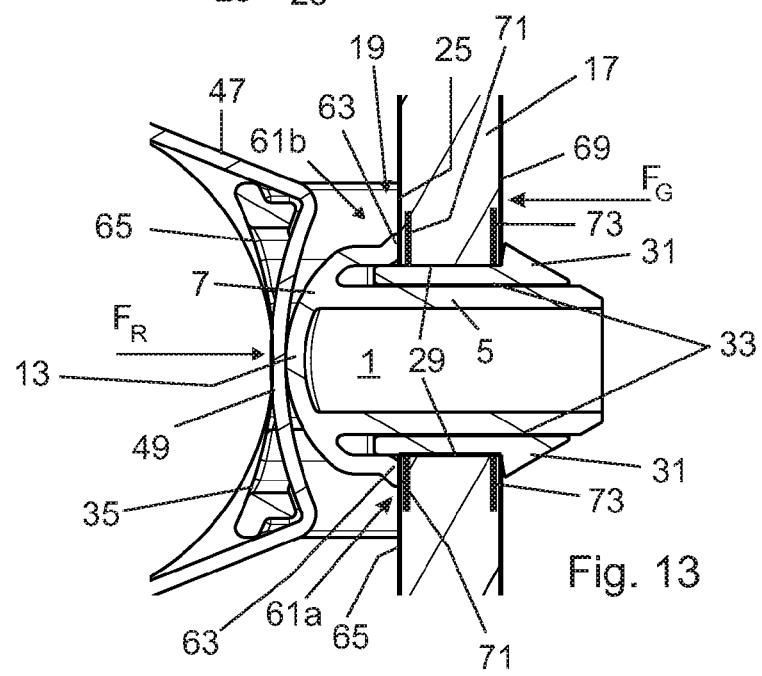
FIG. 13 an enlarged view of a detail from FIG. 12 exemplary visualizing the forces resulting in the course of mounting of the mounting device.

Especially with reference to the FIGS. 9 and 11 to 13 the base part 19 or the mounting device 1, respectively, is further configured to be able to get the head portion 7 of the plug-in part 3 plug-connected with the base part 19 into engagement with a carrier substrate 17 interlocked at the locking legs 27 and herewith furthermore to guide a binder portion 49 across the head portion 7 and central portion 13 of the plug-connected plug-in part 3 and to retain the binder portion 49 at the base part 19 so that the head portion 7 when connecting the binder 47 is urged in plug-in direction A of the plug-in part 3 by means of the binder portion 49 guided across the head portion 7 and connected, see e.g. FIG. 12, 13, but furthermore also—locking of the mounting device 1 to the carrier substrate 17 provided—so that the base part 19 is urged in opposite direction.

For developing the inventive ability of the mounting device for self-adjustment coming along therewith the chassis 23 or rather the base part 19 comprises at opposite front ends 51*a*, *b* or 53*a*, *b*, respectively, of the longitudinal frame webs 41*a*, 43*a* each—arranged oriented towards the retaining side 35—a cross frame web 55*a*, 55*b*, e.g. FIG. 7. With the head portion 7 plugged-in the cross frame webs 55*a*, *b* such provided are—seen from the extensional direction of the longitudinal frame webs 43*a*, *b*—insofar arranged in front of and behind the head portion 7, e.g. FIG. 8.

By means of the cross frame webs 55*a*, *b* each extending from a longitudinal frame web 43*a*, *b* towards the other insofar conducts 57*a*, *b* for a binder 47, especially a binder portion 49 and furthermore especially preferred of a cable tie, are established at each face side 59*a*, *b*, with the conducts 57*a*, *b* enabling to be able to thread a binder portion 49 of a binder 47—seen in the plug-in direction A—through between the head portion 7 and the cross frame webs 55*a*, 55*b*, with the binder 47 guided across the head portion 7 getting into abutment at the head portion 7. The head portion 7 of the plug-connected plug-in part 3 for the secure abutment against the binder 47 obviously projects somewhat beyond the line of sight of the conducts 57*a*, *b*, i.e. in the direction opposite to the plug-in direction A, compare e.g. FIG. 12. Thus, a binder portion 49 threaded in is retained nearly W-shaped at the mounting device 1 and guided across the head portion 7, see FIG. 13.

In case the binder 47 is tightened subsequently by connecting, s. FIGS. 10 to 13, preferably around a load to be connected 37, the binder 47 tries to establish the shortest connection of the binder strip between the cross frame webs 55*a*, *b* and in the course of this tightening urges the head portion 7 by means of the binder portion 49 advantageously in plug-in direction A.

For being able to induce a compression force, the head portion 7 experiences herewith, for the attachment of the mounting device 1 at the carrier substrate 17 into the same or rather expend for the attachment, indicated by the force $F_R$ in FIG. 13, the base part 19 or rather its chassis 23, comprises openings 61a, b through which the head portion 7, with the end portions 63 of the legs 15 pointing towards the free end 9 of the shaft portion 5 can pass, i.e. thus can get into abutment at the carrier substrate 17, see e.g. FIG. 13.

The openings 61a, b insofar are established corresponding with an envisaged pre-alignment of the head portion 7 for plug-in which is also predetermined by the strip portion 21, see e.g. FIG. 7, presently insofar at diametrical opposed sides of the bridge web 43 or rather of the mouth 39 of the plug-in channel 33, i.e. on the face sides each.

According to the invention with connecting of the binder 47 also a pulling force upon the base part 19 of the mounting device 1 locked to the carrier substrate 17 is caused, which pulling force is also induced into the carrier substrate 17, i.e. via the locking legs 27. This force acts in the direction opposite to the compression force, i.e. contrary to the plug-in direction A.

This is more closely explained subsequently by means of FIGS. 12 and 13.

FIG. 12 shows the mounting device 1 with plug-connected base part 19 and plug-in part 3 locked at a carrier substrate 17, at the retaining side 35 furthermore load to be connected 37 to be attached at the carrier substrate 17 is in abutment therewith, especially also in abutment against binder portion 49, the retaining side 35 of the base part 19 comprising a correspondingly shaped bearing shell form 65. The load to be connected 37 furthermore is connected by means of a binder 47 at the mounting device 1, the binder 47, which at the side of the retaining side forms a loop around the load to be connected, urging the head portion 7 according to the invention in plug-in direction A, i.e. exerting a compression force $F_R$, see FIG. 13.

The compression force $F_R$ now is induced into the carrier substrate 17 by means of the elastically formed contact tongues or rather legs 15 of the head portion 7, reference numeral 71 in FIG. 13, which legs 15 with its end portions 63—passing through the openings 61a, b or rather the suitably opened up chassis 23 for this purpose are in contact or abutment at the carrier substrate 17, respectively, i.e. at a mounting side 67 of the same.

Via the locking legs 27 accommodated within the mounting aperture 29 or rather their snap-in hooks 31 simultaneously a pulling force $F_G$ is exerted upon the carrier substrate 17, see exemplary marked in FIG. 13, which is directed adversely to the compression force $F_R$. The pulling force $F_G$ corresponds here with that force which is exerted by the binder 47 upon the cross frame webs 55a, b and is induced by them into the chassis 23, thus is exerted upon the same at a locking side 69 of the carrier substrate 17 via the locking legs 27 connected with the chassis 23, see reference numeral 73 in FIG. 3 referencing the force inducing areas.

Thus on the one hand the head portion 7 is urged against the carrier substrate 17 charged by the binder 47, i.e. at the mounting side 67, on the other hand the locking legs 27, also indirectly charged by the binder 47, against the locking side 69.

In the course of these forces the legs 15 on their part adjust by way of an elastic deformation the balance of forces such that all tolerances are compensated, i.e. the mounting device 1 adjusts itself. Advantageously this position can subsequently also be kept permanently.

LISTING OF REFERENCE NUMERALS 1 mounting device
3 plug-in part
5 shaft portion
7 head portion
9 free end
11 further end
13 central portion
15 leg
17 carrier substrate
19 base part
21 strip portion
23 chassis-shaped portion
25 rest surface
27 locking leg
29 mounting aperture
31 snap-in hook
33 plug-in channel
35 retaining side
37 load to be connected
39 mouth
41a, b longitudinal frame web
43 bridge web
45 interior space
47 binder
49 binder portion
51a, b end face
53a, b end face
55a, b cross frame web
57a, b conduct
59a, b face side
61a, b opening
63 end portion
65 bearing
67 mounting side
69 locking side
71 area experiencing compression force
73 area experiencing pulling force
A plug-in direction

The invention claimed is:

1. A mounting device, comprising:
a plug-in part with a shaft portion and a head portion; and
a base part with a rest surface and a retaining side opposed to the rest surface; wherein the base part comprises a plurality of locking legs projecting from a side of the rest surface configured to lock within an aperture of a carrier substrate, wherein the base part is connectable with the plug-in part by inserting the shaft portion in a plug-in channel of the base part from the part of the retaining side in a plug-in direction extending from the retaining side towards the rest surface, wherein the plug-in channel is defined by the plurality of locking legs, and wherein the mounting device is configured to be able to bring the head portion of the plug-in part plug-connected with the base part into engagement with the carrier substrate locked at the plurality of locking legs and to guide a binder portion across the head portion of the connected plug-in part and retain the binder portion at the base part such that the head portion is urged in the plug-in direction when connecting a binder by the binder portion guided across and connected, while the base part is urged in opposite direction.

2. The mounting device according to claim 1, wherein the mounting device is formed of a single-piece.

3. The mounting device according to claim 1, wherein the plug-in part is connected with the base part via a strip portion.

4. The mounting device according to claim 3, wherein the strip portion effects a pre-alignment of the head portion with the base part when plugging the plug-in part into the base part.

5. The mounting device according to claim 1, wherein at least one opening is formed in the base part through which the head portion can get into engagement against the carrier substrate.

6. The mounting device according to claim 1, wherein the head portion comprises at least one elastically formed contact element for engagement at the carrier substrate.

7. The mounting device according to claim 1, wherein the base part is at diametrically opposed sides of the plug-in channel comprising an opening for a corresponding contact element of the head portion and wherein the head portion correspondingly comprises diametrically arranged contact elements with regard to the shaft portion.

8. The mounting device according to claim 1, wherein the base part comprises a conduct for the binder to be connected at opposed edge regions and wherein the plug-in channel is formed between the conducts.

9. The mounting device according to claim 1, wherein the mounting device is configured to retain a connected binder that is W-shaped by means of the conducts and the head portion.

10. The mounting device according to claim 1, wherein the base part forms an accommodation for a load to be connected at the retaining side.

11. The mounting device according to claim 1, wherein the plug-in channel has a diameter such that the inserted shaft portion is in abutment with an outer circumference of the plug-in channel at the plurality of locking legs.

12. The mounting device according to claim 1, wherein the mounting device is made of plastic.

13. The mounting device according to claim 1, wherein the mounting device is configured to adjust itself under compensation of tolerances at the carrier substrate via connecting of the binder.

* * * * *